United States Patent
Mueller

(10) Patent No.: US 6,359,400 B1
(45) Date of Patent: Mar. 19, 2002

(54) DIRECT DRIVE SPINDLE FOR USE IN CHEMICAL VAPOR DEPOSITION

(75) Inventor: Peter Michael Mueller, Suwanee, GA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/542,362

(22) Filed: Apr. 4, 2000

(51) Int. Cl.$^7$ .................... H02K 29/10; C03B 37/027
(52) U.S. Cl. ..................... 318/138; 254/439; 65/484
(58) Field of Search ........................... 318/138, 254, 318/439; 65/483, 484

(56) References Cited

U.S. PATENT DOCUMENTS 4,743,813 A * 5/1988 Tassinario .................. 318/138
5,658,365 A * 8/1997 Chludzinski et al. ......... 65/484

\* cited by examiner

*Primary Examiner*—Khanh Dang
(74) *Attorney, Agent, or Firm*—Thomas, Kayden, Horstemeyer & Risley, LLP

(57) ABSTRACT

A direct drive system for use in, for example, the MCVD process, includes a motor housing affixed to a lathe headstock which contains electrical motor windings, and forms the stator of the motor. A hollow rotatable spindle is contained within the headstock housing and has winding and commutator magnets, thereby forming the armature of the motor. A chuck mounted on the spindle grasps the primary exhaust portion of a starter tube which intrudes into a sealed chamber within the spindle. A secondary exhaust tube intrudes into the chamber forms the other end thereof, and is attached to a low pressure source. Bores in the motor housing permit introduction of a flushing gas into the chamber which, in operation, sweeps the gases out of the tubes and chamber, thereby flushing out the starter tube. An encoded disk on the armature and a detector on the motor housing produce pulse signals indicative of the speed of rotation of the spindle and the rotational position thereof and the signals are applied to a processor for controlling the motor rotational speed.

17 Claims, 6 Drawing Sheets

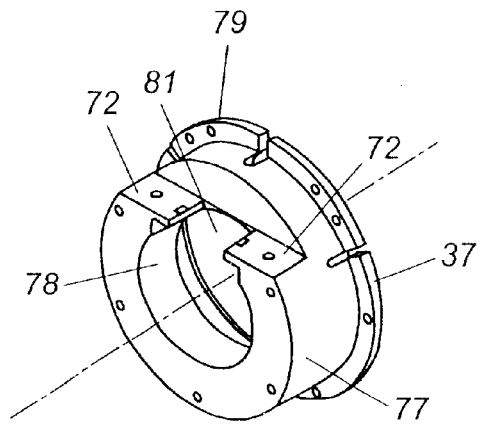 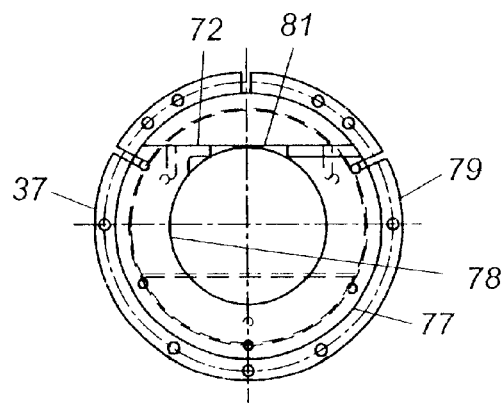
FIG. 7a  FIG. 7b
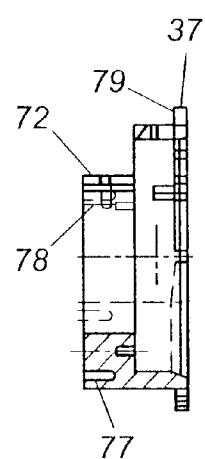 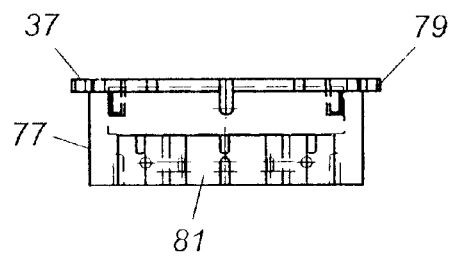
FIG. 7c  FIG. 7d

DIRECT DRIVE SPINDLE FOR USE IN CHEMICAL VAPOR DEPOSITION

RELATED APPLICATIONS

This application concerns subject matter related to that shown in U.S. patent application Ser. No. 09/426,491 of Mueller, filed Oct. 26 1999; Ser. No. 09/426,968 of Mueller, filed Oct. 26, 1999; Ser. No. 09/533,507, filed Mar. 23, 2000 of Mueller; and Ser. No. 09/500,154 of Mueller, filed Feb. 8, 2000, the disclosures of all of which are incorporated herein by reference.

FIELD OF THE INVENTION

This invention relates to an apparatus for supporting and rotating a tubular member mounted on a lathe, and, more particularly, to such an apparatus for use in the MCVD process for producing optical fiber

BACKGROUND OF THE INVENTION

Optical fiber of the type used to carry optical signals is fabricated typically by heating and drawing a portion of an optical preform comprising a refractive core surrounded by a protective glass cladding. Presently there are several known processes for fabricating preforms. The modified chemical vapor deposition (MCVD) process, which is described in U.S. Pat. No. 4,217,027, issued in the names of J. B. MacChesney et al. on Aug. 12, 1980 and assigned to Bell Telephone Laboratories, Inc., has been found to be one of the most useful because the process enables large scale production of preforms which yield very low loss optical fiber.

During the fabrication of preforms by the MCVD process, reactant-containing gases, such as $SiCl_4$ and $GeCl_4$ are passed through a rotating substrate or starter tube suspended between the headstock and tailstock of a lathe. A torch assembly, which heats the tube from the outside as the gases are passed therethrough, traverses the length of the tube in a number of passes, and provides the heat for the chemical reactions and deposition upon the inner wall of the tube. The torch assembly also supplies the heat for collapsing the tube to form a rod, and, in subsequent operations, for collapsing an overclad tube onto the rod, as explained in U.S. patent application Ser. No. 09/353,943 of Mueller et al., filed Jul. 15, 1999. In the current manufacture of preforms, the torch is mounted on a carriage which is a solid structure supported and guided on the lathe or machine bed. In such a system, it is desirable that operation of all moving parts be smooth and uniform but there are several areas in which such smooth operation is difficult to achieve. Thus in the systems as currently used, sliding or rolling elements on the carriage are in direct contact with the bed of the lathe or machine or with the ways. In all such systems, the movement of the carriage and the physical contact between it and the bed requires lubrication to eliminate wear and friction. An initial "stick-skip" condition must be overcome during the start of carriage motion which is a result of the friction, and the friction can also induce "jerk" in the movement of the carriage along the bed. In addition, the friction can cause or induce, over a period of time, freeplay in the system as a result of wear. Thus, where a smooth uniform velocity of the torch down the length of the tube virtually is a necessity for uniformity of heating and deposition and, ultimately, a uniformity of product, the friction effects can, and most often do, cause a non-uniform velocity profile, and, as a consequence, non-uniformity of heating and deposition, which result in non-uniformity of product. In present day practice, friction is overcome, at least in part, through the use of lubricants which, during a production run, become a contaminant to the process and spread throughout the machine. This, in turn, necessitates frequent cleaning of the apparatus which is detrimental to the goal of substantially continuous production. Further, the lubricant does not completely eliminate the stick-slip and jerk problems which, as pointed out in the foregoing, most often lead to a non-uniform velocity profile.

The related U.S. patent application Ser. No. 09/500,154 of Mueller is directed to a carriage guidance system that substantially eliminates physical contact between the carriage and lathe bed and, hence, overcomes most if not all of the aforementioned problems. The arrangement shown in that application is a hydrostatic guidance and support system for the movable carriage upon which the torch for the MCVD process is mounted. The carriage, as used on the MCVD lathe, is equipped with integral air bearing components which, in their geometry, match the lathe bed cross-section. Fluid, such as air, under pressure, is delivered to the bearings which, under pressure of the air or whatever fluid is used, in use, cause the carriage to float in spaced relationship to the lathe, thereby producing a substantially friction free support and guide for the carriage, which results in a smooth velocity profile, which, in turn, produces a drastic improvement in the quality (and quantity) of the MCVD product.

There remains, however, in present systems, another source of non-uniform or jerky movement, and that is in the drive system of the lathe for rotating the tubular member or members. The headstocks of the lathe provide the means for rotating, for example, the preform during the process. They operate on a common centerline of rotation and are phased to rotate together. One headstock can function as a tailstock for allowing the preform to rotate as driven by the headstock. Attached to the headstock spindle is a chuck which clamps to the starter tube and the driven headstock spindle is hollow to allow passage of the tube or other apparatus through the bore. In current systems, the headstock/spindle is driven by a mechanical connection to a prime mover, such as an electric motor. The mechanical connection can be a shaft/chain/reducer, a timing belt/sprocket, or a reducing gear train. In all of these cases, the connection represents a maintenance/lubrication/wear concern. Also, the connections have an inherent backlash and stiffness associated with their operation which can result in uneven rotation of the starter tube, and which can affect the overall performance of the control loops and contribute to spindle prime mover to spindle commanded position error.

In addition to the foregoing problems, the even coating of the interior of the tube throughout its length is difficult to achieve. The gaseous coating material is introduced into the tube, under pressure, at, for instance, the tailstock end thereof and proceeds down the tube toward the headstock end. Especially in those instances where the tube is of considerable length, the velocity of the gaseous mixture decreases toward the headstock end, and there is a tendency for it to accumulate in that region, resulting in an unevenness of coating of the tube walls.

SUMMARY OF THE INVENTION

The present invention includes a direct drive spindle assembly which eliminates or alleviates the foregoing problems of the prior art. The assembly comprises a stationary headstock member supported on upstanding support legs mounted to the lathe and within which is mounted, with tapered roller bearings, a hollow spindle. A motor housing is mounted at one end of the headstock member and contains a circular array of motor windings. At the motor end of the spindle is mounted a reduced diameter portion which functions as the rotating motor armature, having winding and commutator magnets mounted thereon for interaction with the motor windings. At the other end of the spindle is mounted a chuck adapter and a chuck for grasping the primary exhaust tube portion of the starter tube. A bored magnetic encoder disk is mounted to the reduced diameter portion of the spindle and separated from the effects of the permanent armature and commutation magnets by shielding, and a circuit board having a detector mounted thereon is attached to the stator or motor housing for reading positional and rotation increment signals from the disk as it rotates with the spindle. The detector output can be applied to a processor which controls the motor power source to vary the speed of the motor, for example.

In accordance with one aspect of the invention, the spindle is rotationally sealed to the motor stator or housing, and the chuck adapter bore and the bore in the reduced diameter or armature portion of the spindle each have O-ring seals thereon so that when the primary exhaust tube and a secondary exhaust tube are inserted in the bores, the interior of the spindle constitutes a sealed chamber. In use, the primary exhaust tube attached to the end of the starter tube ends within the sealed chamber, and the secondary exhaust tube projects into the chamber and the primary exhaust tube through the bore in the armature portion of the spindle.

In accordance with another aspect of the invention, the motor housing has a circular passageway or groove formed on the interior wall thereof,, the walls of the passageway extending close to the armature portion of the spindle. Seals are mounted on either side of the passageway or groove to create a sealed space between the stator and armature portions. A bore extending from the exterior of the stator portion communicates with the groove for supplying a flushing gas, such as oxygen, to the groove, which gas is prevented from escaping by the seals. The armature portion of the spindle has a plurality of bores therein which communicate with the groove (or sealed space) and with the sealed chamber within the spindle, thus the flushing gas is directed into the sealed chamber of the spindle. In use, the end of the secondary exhaust tube which extends through the motor or armature bore to the outside of the apparatus is connected to a low pressure or vacuum supply through a rotatable connection so that the flushing gas is passed through a portion of the primary or outer exhaust tube and out of the secondary or inner exhaust tube, sweeping the remnant gases of the starter tube. In this way, the gaseous mixture in the starter tube is prevented from accumulating in the end region thereof, and more uniform coating of the starter tube walls is realized.

The spindle and direct drive motor, as will be apparent hereinafter, eliminates a large measure of jerkiness and uneven rotation, is of modular construction and lends itself to facilitating maintenance. The entire drive assembly can be quickly replaced as an entire unit, or individual sub-modules may be replaced without disturbing the remainder of the assembly. Other benefits realized with the invention, in addition to such simplified maintenance, are enhanced product quality, decreased associated equipment costs, flexibility of configuration, less production down time, and decreased process area contamination.

These and other features and advantages of the present invention will be readily apparent from the following detailed description, read in conjunction with the accompanying drawings.

DESCRIPTION OF THE DRAWINGS

FIGS. 7(*a*) through 7(*d*) are several views of a portion of the motor housing of FIGS. 1 through 5.

DETAILED DESCRIPTION

The direct drive arrangement of the present invention is adaptable to a number of different applications or systems. In the following description, it is depicted as used with a system for the manufacture of optical fiber preforms for which it is particularly well suited, but other possible applications are not intended to be excluded.

In the fabrication of the preform for drawing clad glass fibers, generally gas phase precursor reactants together with oxygen are introduced into a glass tube, i.e., a starter tube, in a constantly moving stream. The tube and its contents are heated to a homogenous reaction temperature within a moving heating element which continuously traverses the outside surface of the rotating tube along its length. Homogeneously produced glass particles, commonly called "soot" collect on the interior wall of the tube and are fused into a continuous layer within the moving hot zone. In the modified vapor deposition (MCVD) process shown and described in the aforementioned MacChesney et al. U.S. Pat. No. 4,217,027, the tube is continuously rotated about its longitudinal axis and is suspended between the headstock and tailstock of a suitable lathe. As pointed out in the foregoing, it is highly desirable that the headstock and tailstock rotate in unison. In some instances, both the headstock and tailstock are driven by servo motors, and means is provided to synchronize the two driving motors.

Figure 1:
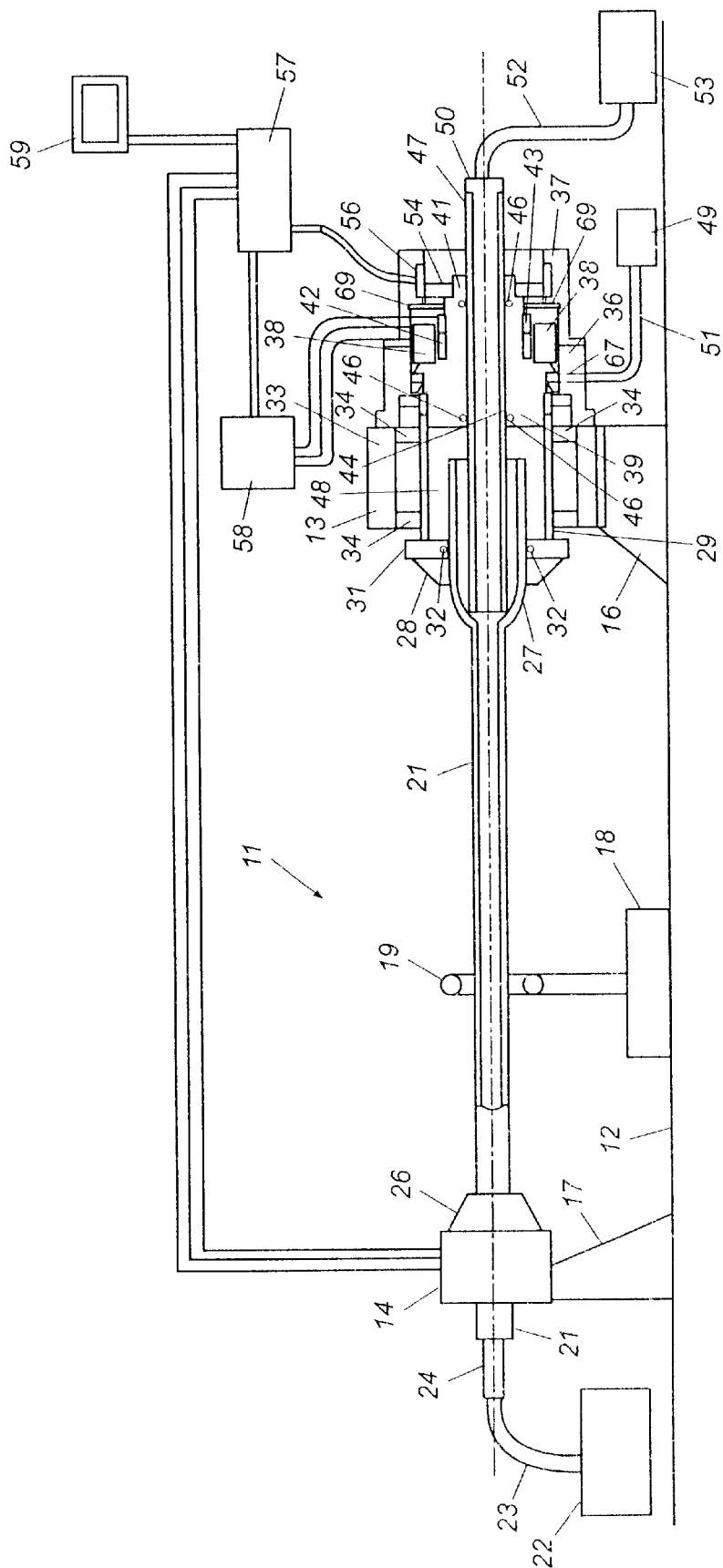
FIG. 1 is a diagrammatic view of the direct drive system of the present invention.

FIG. 1 is a diagrammatic view of an apparatus or system 11 for the MCVD process of producing starter tubes which utilize the direct drive arrangement of the present invention. The apparatus 11 of FIG. 1 comprises a lathe bed 12, a headstock 13 and a tailstock 14 supported on the bed 12 by suitable support means 16 and 17 respectively, and a movable carriage 18. Carriage 18 supports a ring torch 19 which surrounds the glass starter tube 21 suspended between headstock 13 and tailstock 14 and which is rotated thereby. A source 22 of gaseous materials supplies such materials to the interior of tube 21 by means of conduit 23 and delivery tube 24 which is inserted into tube 21. The tube 21 itself is rotatable mounted to tailstock 14 by means of an adjustable chuck 26.

The tube 21, at its headstock end, has an enlarged portion 27 which serves as a primary exhaust tube, the function and operation of which will be discussed more fully hereinafter, and which is grasped by a chuck 28 mounted on one end of a hollow spindle 29 by means of a suitable chuck adapter 31. As can be seen in FIG. 1, chuck adapter 31, which forms part of the chuck, has an O-ring sealing member 32 which functions to create a seal between primary exhaust tube 27 and chuck adapter 31, thereby sealing that portion of the interior of spindle 29 from external ambience. Spindle 29 is mounted within a stationary housing member 33 and is rotatable with respect thereto by means of suitable bearing members 34,34 which may take any of a number of suitable forms, such as tapered roller bearings, for example, but which are shown diagrammatically in FIG. 1. Attached to the rear of housing 33 is a two part motor housing 36 and 37 which support therein motor windings 38, and attached to the rear of spindle 29 is a block member 39 which has a reduced diameter portion 41 upon which are mounted armature magnets 42 and commutation magnets 43, which are positioned to interact with stationary motor windings 38. Thus motor housing 36, 37 is the stator and spindle 29 and member 39 the rotor of a servo motor, thereby functioning as a direct drive for chuck 28.

Block member 39 has a central bore 44 extending therethrough with O-ring sealing members 46, 46 to provide seals for a secondary exhaust tube 47 extending therethrough. The net effect of seals 32 and 46 is to make the interior of spindle 29 a sealed chamber 48. A flushing gas, such as oxygen, is introduced from a source 49 through a conduit 51 into chamber 48 in a manner which will be discussed in detail hereinafter, and secondary exhaust tube member 47 is connected through a rotatable coupler 50 and conduit 52 to a low pressure or vacuum source 53 for flushing tubes 21 and 27 and chamber 48, as will be explained hereinafter.

Mounted on the reduced diameter portion 41 of the spindle 29 is an encoder disk 54 which rotates with the spindle 29 and which, in conjunction with a stationary detector 56 mounted on motor housing 37 generates signals during operation, in a manner to be discussed more fully hereinafter, which are applied to a signal processor 57 through suitable leads. The processor 57 generates control signals which are applied to a power source 58 which supplies power to the motor windings 38 and, where necessary, to a commutator circuit board 55 (see FIG. 5), to control the speed of rotation of the motor. In the case where tailstock 14 includes a driving motor, processor 57 applies synchronizing signals thereto to maintain synchronized rotation of both headstock and tailstock motors. Processor 57 also generates, where necessary, position signals indicative of the rotational position of the spindle, as well as signals indicative of the speed of rotation, which can be applied to a suitable display device for monitoring performance.

Figure 2:
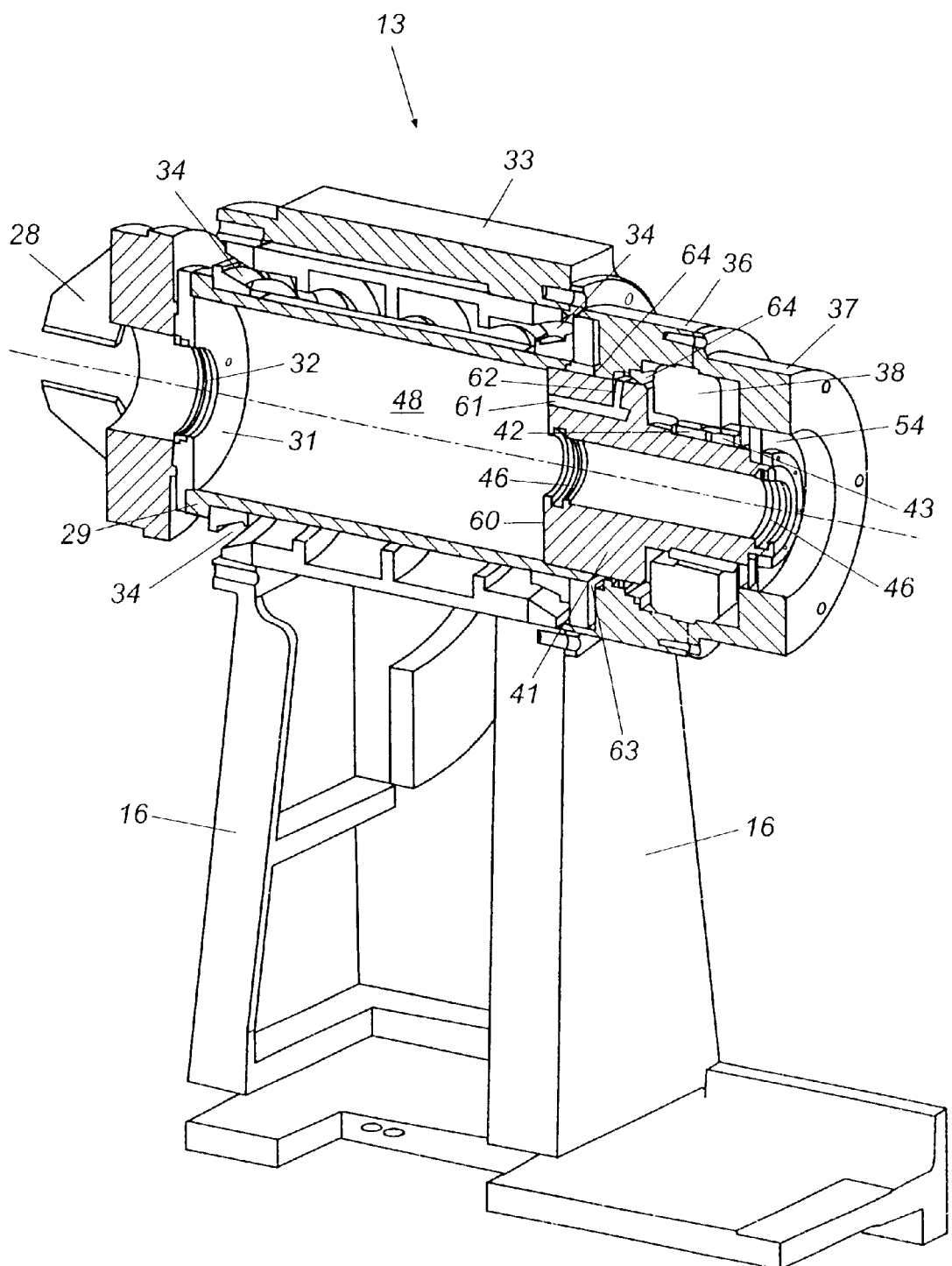
FIG. 2 is a perspective, partially cross-sectional view of the direct drive motor of the present invention in the headstock of the lathe.
Figure 3:
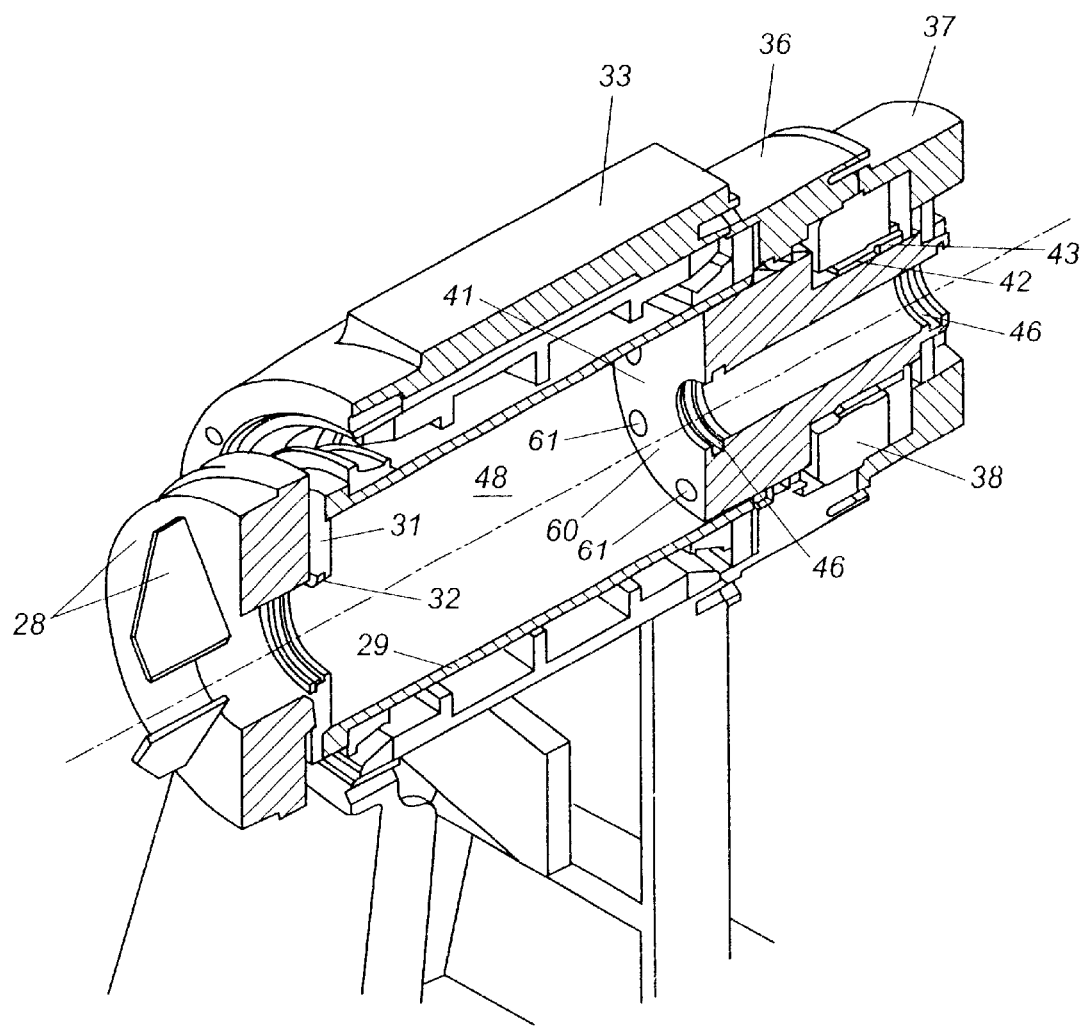
FIG. 3 is a different perspective, partially cross-sectional view of the motor of FIG. 2.

FIGS. 2 and 3 are perspective, partially cross-sectional views of headstock 13, showing the details of the direct drive motor of the invention as mounted in the system of FIG. 1. For simplicity, like parts bear the same reference numerals throughout the several views. As can be clearly seen in FIGS. 2 and 3, the motor housing 36,37 supports the windings 38 and thus, being affixed to housing 33, functions as the stator of the motor. Spindle 29 and reduced diameter portion 41, which bears the armature and commutator magnets 42 and 43, rotatably suspended within housing 33 by means of bearings 34, function as the armature or rotor of the motor.

Figure 4:
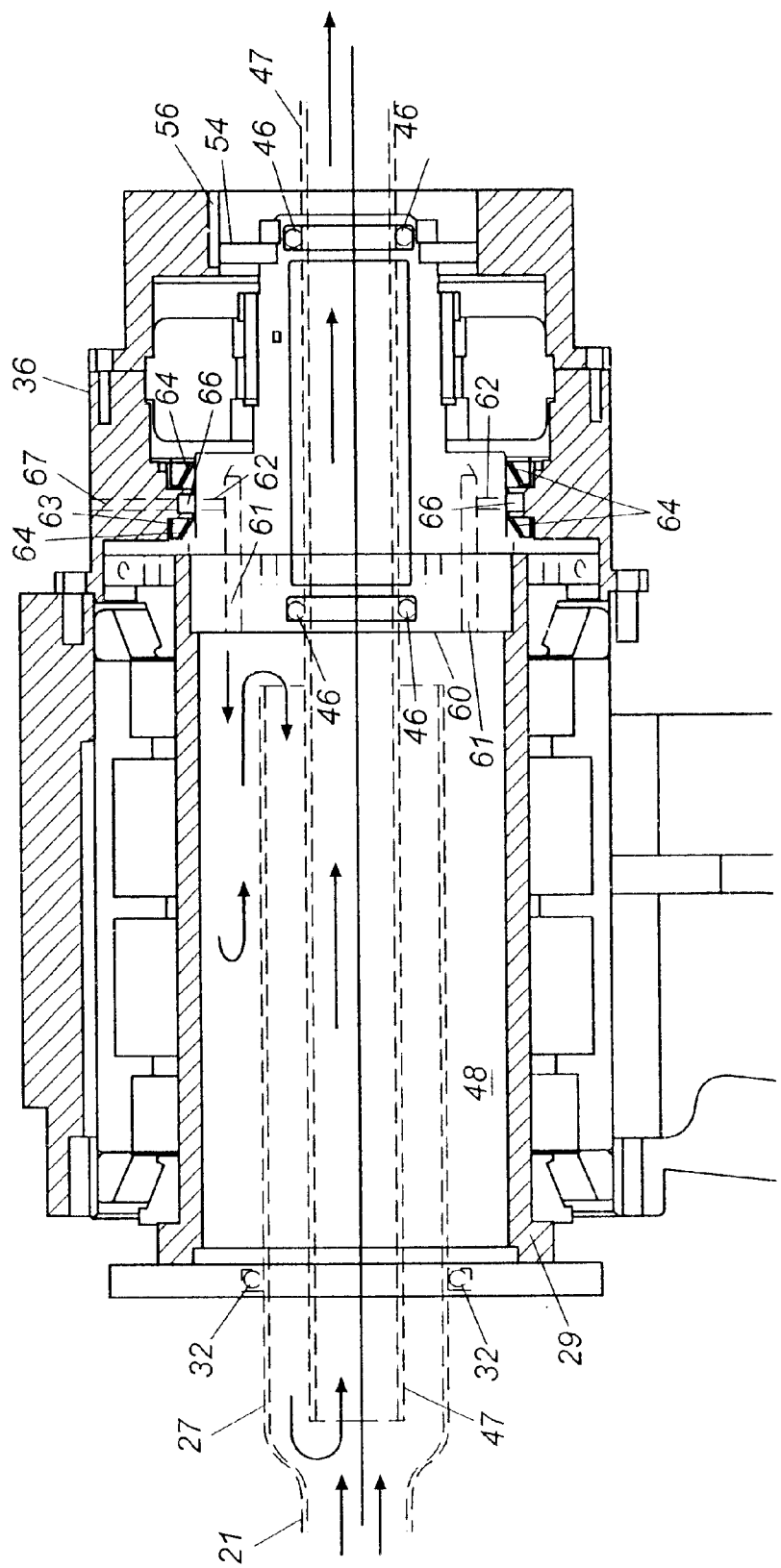
FIG. 4 is an elevation, partially cross-sectional view of the motor of FIGS. 2 and 3.

The front face 60 of reduced diameter portion 41 has one or more bores 61 therein which connect with a corresponding member of radial bores 62 which communicate with sealed space 63 formed by seals 64 and a circular or peripheral channel 66 formed in motor housing member 36, as best seen in FIG. 4. Space 63 and channel 66 are, in turn, connected to the exterior by one or more radial bores 67, which, as shown in FIG. 1, is connected through conduit 51 to a source 49 of flushing gas. The details of this arrangement are shown more clearly in FIG. 4, which is a side elevation view in partial cross-section of the direct drive motor of the invention and the position and orientation of the glass tubes with respect thereto. In operation, the primary exhaust tube 27, shown in dashed line, which is integral with starter tube 21, is inserted into hollow spindle 29, as shown, thereby sealing the front end of the spindle by means of O-ring 32, and is gripped by chuck 28 (not shown in FIG. 4). Secondary exhaust tube 47 is inserted into the spindle 29 from the other end, as shown, and completes the sealing of chamber 48 within spindle 29 by means of the O-rings 46,46. Oxygen or other suitable flushing gas is introduced into chamber 48 from source 49 (see FIG. 1) through bore 67, sealed space 63, which includes channel 66, bore or bores 62, and bores 61. Thus, even through the spindle 29 and reduced diameter portion 41 rotate, the gas is continuously introduced, under pressure, into sealed chamber 48 and travels in the direction of the arrows into and through primary exhaust tube 27 toward the front and into secondary exhaust tube 47, sweeping the remnant gaseous mixture of the MCVD process with it. Inasmuch as tube 47 is connected to a low pressure source, as shown in FIG. 1, the movement of the gases is positive, and the end of the starter tube is flushed of accumulated gas.

Figure 5:
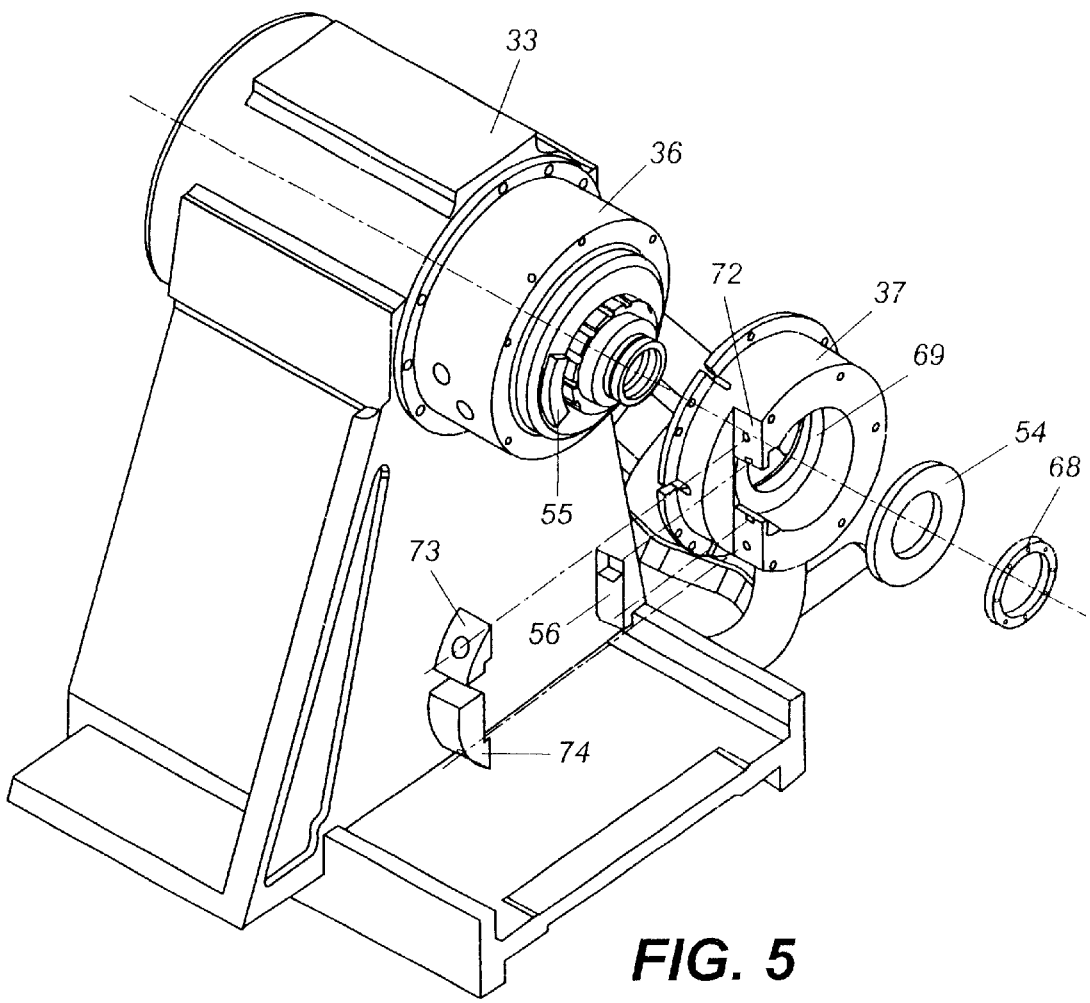
FIG. 5 is a partially exploded perspective view of the motor of FIGS. 2 and 3.
Figure 6:
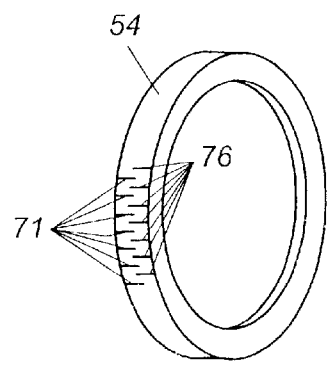
FIG. 6 is a perspective view of an encoded disk for use in the arrangement of FIG. 5.

FIG. 5 is a perspective partially exploded view of the exhaust end of the housing 33 and of the motor which illustrates the arrangement for detecting signals from the encoder disk 54 which is mounted on the end of reduced diameter portion 41 and held in place by a suitable retaining ring 68. Disk 54 is preferably made of a magnetizable plastic material and is shielded from the effects of windings 38 and magnets 42 and 43 by a shielding ring 69. The outer periphery of disk 54 is encoded with a first array or track 71 of equally spaced magnetic lines as best seen in FIG. 6, extending completely around the periphery. Motor housing member 37 has a flat 72 formed thereon for supporting a detector circuit board 56 which is clamped in place by suitable clamping members 73 and 74 which are preferably bolted to housing 37. As the spindle 29, and hence, disk 54 rotate, the lines of track 71 generate in the detector a sequence of pulses. For a typical encoder disk, the first track 71 has 1024 lines, which produce in detector 56 a total of 1024 pulses per revolution. The processing unit 57 counts the pulses and computes the speed of rotation of spindle 29 and hence of tube 21. In addition, where step rotation rather than continuous rotation is used, the processor counts the number of pulses to determine the amount of rotation and the position of the ring from a given reference point. Where even greater, or more precise, measurement is desired, a second track 76 of lines interleaved with the lines of the first track 71 doubles the number of pulses generated in one complete rotation of the encoder disk 54, thereby imparting greater accuracy of measurement. The encoder disk 54 can have different arrangements of pulse generating magnetized portions, i.e., lines depending upon what parameter or parameters are to be measured and upon the degree of accuracy desired, which can involve more than just two tracks.

FIGS. 7(a) through 7(d) are various views of motor housing 37 and its configuration for receiving and securing detector circuit board 56 thereto. As seen in FIG. 7(a), housing 37 comprises a cylindrical portion 77 having a bore 78 extending therethrough and a mounting flange 79 at one end for mounting housing 37 on motor housing 36. Housing 37 may be made of a suitable material such as stainless steel which is only minimally, if at all, susceptible to temperature changes. The flat surface 72 is cut into housing 37, as shown, deep enough so that an opening 81 is created through which the detector 56 is enabled to read the encoder lines on disk 54. Clamping member 73 and 74 are bolted to flat surface 72 with the detector board 56 sandwiched therebetween. Thus, in operation, detector board 56 is held rigidly in place on motor housing 37 and reads the encoded line tracks 71 and 76 on rotating disk 54 through opening 81.

From the foregoing, it can be seen that the unique direct drive system of the present invention is basically a modular arrangement having, basically, only one moving part with its components being mounted thereto allowing for easy replacement of individual parts without disassembly of the system. The arrangement of the secondary exhaust tube within a sealed chamber insures enhanced product quality and decreased area contamination. Overall, maintenance is simplified with a consequent decrease in down time and decrease in equipment costs.

Although the features and principles of the present invention have been illustrated in apparatus for use in the MCVD process, it is to be understood that these features and principles are readily adaptable for use with other, different processes, and that other modifications or adaptations might occur to workers in the art. All such variations and modifications are intended to be included herein as being within the scope of the present invention as set forth. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A direct drive assembly for use with a lathe headstock for rotating a tubular member having a primary exhaust tube on one end thereof said assembly comprising:

a stationary housing member;

a hollow spindle rotatably mounted in said housing, said spindle having a reduced diameter portion mounted on a first end thereof and an adjustable chuck mounted on a second end thereof;

a motor housing having motor windings therein and affixed to said stationary housing member;

magnetic members mounted on said reduced diameter portion and underlying said windings for interaction therewith;

said chuck having an adapter plate having a first bore therein having a sealing member, said chuck being adapted to grasp the primary exhaust tube and said sealing member being adapted to form a seal therewith for sealing the first end of the interior of said hollow spindle;

said reduced diameter portion having a second bore extending therethrough for permitting passage of a secondary exhaust tube into the interior of said hollow spindle, said second bore having at least one sealing member therein for sealing the second end of the interior of said hollow spindle in conjunction with said secondary exhaust tube; and said motor housing member and said reduced diameter portion each having at least one gas transmission bore for introducing a flushing gas into the interior of said hollow spindle.

2. A direct drive assembly as claimed in claim I and further including a circular encoding disk affixed to the end of said reduced diameter portion remote from said hollow spindle, said encoding disk having pulse generating magnetic lines arrayed in a first track around the circumference of said disk.

3. A direct drive assembly as claimed in claim 2 and further including a detector member mounted on said motor housing member for detecting signals generated by said disk.

4. A direct drive assembly as claimed in claim 2 wherein said encoding disk has a second track of pulse generating lines arrayed around the circumference of said disk and spaced from said first track.

5. A direct drive assembly as claimed in claim 2 wherein said encoding disk is made of a magnetizable plastic material.

6. A direct drive assembly as claimed in claim 1 wherein said motor housing member has a third bore therein surrounding at least a portion of said reduced diameter portion;

a circumferential channel formed on the inner periphery of said third bore and forming a space between said motor housing member and said reduced diameter portion; and said gas transmission bore in said motor housing member extending from the exterior of said motor housing member to said circumferential channel for introducing flushing gas into said channel.

7. A direct drive assembly as claimed in claim 6 wherein said gas transmission bore in said reduced diameter portions communicates with said space between said motor housing member and said reduced diameter portions and further communicates with the interior of said hollow spindle.

8. A direct drive assembly as claimed in claim 6 and further including sealing members for sealing said space between said motor housing member and said reduced diameter portion.

9. A direct drive system for rotating a tubular member into which chemical vapor is to be deposited, the tubular member having a primary exhaust tube at one end thereof and being mounted for rotation between the headstock and tailstock of a lathe, said system comprising:

a housing member;

a hollow spindle rotatably mounted in said housing, said spindle having a chuck at a first end thereof for gripping the primary exhaust tube;

a reduced diameter member at a second end of said hollow spindle and having a bore extending therethrough through which a secondary exhaust tube passes;

at least a first sealing member for sealing the primary exhaust tube in a portion of said chuck;

at least a second sealing member for sealing the secondary exhaust tube in the bore of said reduced diameter member, said first and second seals creating a sealed chamber within said hollow spindle;

a motor housing member affixed to said housing member;

motor winding members mounted in said motor housing member and a power source for applying power thereto;

magnetic members mounted on said reduced diameter portion for interaction with said winding member;

a source of flushing gas; and flushing gas passageways for applying flushing gas through said motor housing member and said reduced diameter portion to the sealed chamber within said spindle.

10. A direct drive system as claimed in claim 9 wherein first end of the secondary exhaust tube is located within the primary exhaust tube within said sealed chamber; and a low pressure source is connected to a second end of the secondary exhaust tube.

11. A direct drive system as claimed in claim 9 and further comprising:
   an encoding disk mounted on said reduced diameter portion and rotatable therewith, said disk having a first plurality of magnetic lines arrayed in a first track around the periphery of said disk.

12. A direct drive system as claimed in claim 11 and further comprising a stationary detector member mounted on said motor housing member adjacent the periphery of said encoding disk for generating pulse signals as said disk rotates therepast.

13. A direct drive system as claimed in claim 12 and further comprising:
   a signal processor connected to said detector member for processing the pulse signals generated thereby.

14. A direct drive system as claimed in claim 13 wherein said signal processor is connected to said power source for controlling the power applied to said motor winding members.

15. A direct drive system as claimed in claim 11 wherein said encoding disk has a second plurality of magnetic lines arrayed in a second track around the periphery of said disk.

16. A direct drive system as claimed in claim 11 wherein said encoding disk is made of a magnetizable plastic material.

17. A direct drive system as claimed in claim 12 and further comprising:
   a shielding ring mounted to said motor housing for magnetically shielding said disk and said detector from said motor windings.

* * * * *